United States Patent [19]

Frank

[11] 4,355,485
[45] Oct. 26, 1982

[54] STACKING CONTAINERS

[76] Inventor: Peter A. Frank, 46/47 Frith St., London W1, England

[21] Appl. No.: 178,477

[22] Filed: Aug. 15, 1980

[30] Foreign Application Priority Data

Aug. 15, 1979 [GB] United Kingdom ............... 7928478

[51] Int. Cl.³ .............................................. A01G 9/02
[52] U.S. Cl. .................................................. 47/82
[58] Field of Search .......................... 47/66, 67, 82, 83

[56] References Cited

U.S. PATENT DOCUMENTS

| 3,137,095 | 1/1964 | Pearson. | |
|---|---|---|---|
| 4,057,931 | 11/1977 | Stutelberg et al. | |
| 4,138,803 | 2/1979 | Sherlock | 47/67 |
| 4,151,680 | 5/1979 | Sena | 47/66 |

FOREIGN PATENT DOCUMENTS

| 2726298 | 12/1978 | Fed. Rep. of Germany | 47/66 |
|---|---|---|---|
| 572301 | 12/1975 | Switzerland. | |
| 587001 | 4/1977 | Switzerland. | |
| 448886 | 6/1936 | United Kingdom. | |
| 1096184 | 12/1967 | United Kingdom. | |
| 1287296 | 8/1972 | United Kingdom. | |
| 1323946 | 7/1973 | United Kingdom. | |
| 1345247 | 1/1974 | United Kingdom. | |
| 1347964 | 2/1974 | United Kingdom. | |
| 1409046 | 10/1975 | United Kingdom. | |
| 1549621 | 8/1979 | United Kingdom. | |

Primary Examiner—James R. Feyrer
Attorney, Agent, or Firm—Cushman, Darby & Cushman

[57] ABSTRACT

A container (2) such as a plant holder is provided with formations at its lower end to enable it to be stacked on other such holders in a staggered formation so that none of the supporting containers need be closed off. The containers are polygonal, so that they can be interlocked in edge to edge formation A or corner to corner formation B. Drain holes are provided so as to enable the upper containers of an array to drain into the lower ones and then to supporting trays (3).

5 Claims, 5 Drawing Figures

STACKING CONTAINERS

This invention relates to containers such as plant pots or plant pot holders, of the type having matching top and bottom formations wherein containers may be stacked in an array.

Plant pots which stack one upon another are disclosed for example in U.K. Registered Design Nos. 985970-72 wherein pots are joined together side by side and can also be stacked vertically one upon another. However, pots of this type have the disadvantage that a pot which has another stacked vertically above it cannot itself contain a plant.

U.S. Pat. No. 4057931 discloses plant pots having annular bottom rims with recesses therein which fit over the upper rims of other such pots, enabling the pots to be stacked in a partially staggered formation when being transported. However, the overlap is such that they could not be so stacked when holding plants which extend above the upper rim of the pot. They are not therefore suitable for display purposes.

The present invention provides a stackable container having an open upper end and formations on its lower end adapted to co-operate with an edge of the upper end of a similar container, to enable the plurality of such containers to be stacked one above the other in horizontally staggered formation, characterised in that at least the upper and lower ends are polygonal in plan view and the formations on the bottom are such as to enable two such containers to interlock along respective edges (A), or at respective corners (B) thereof when stacked, and that the bottom of the container has drain holes with removable plugging means positioned at its periphery to enable the container to be stacked above another in a staggered arrangement with at least one said drain hole opening into the container below.

The bottom formations are preferably in the form of projections. The containers are preferably hexagonal in horizontal cross-section.

The positioning of the drain holes at the corners means that when the container is positioned above another a drain hole can be arranged to open into the container below even though only a small portion of the upper container is directly above the lower one.

Preferred embodiments of the present invention will now be described with reference to the accompanying drawings wherein.

Figure 1:
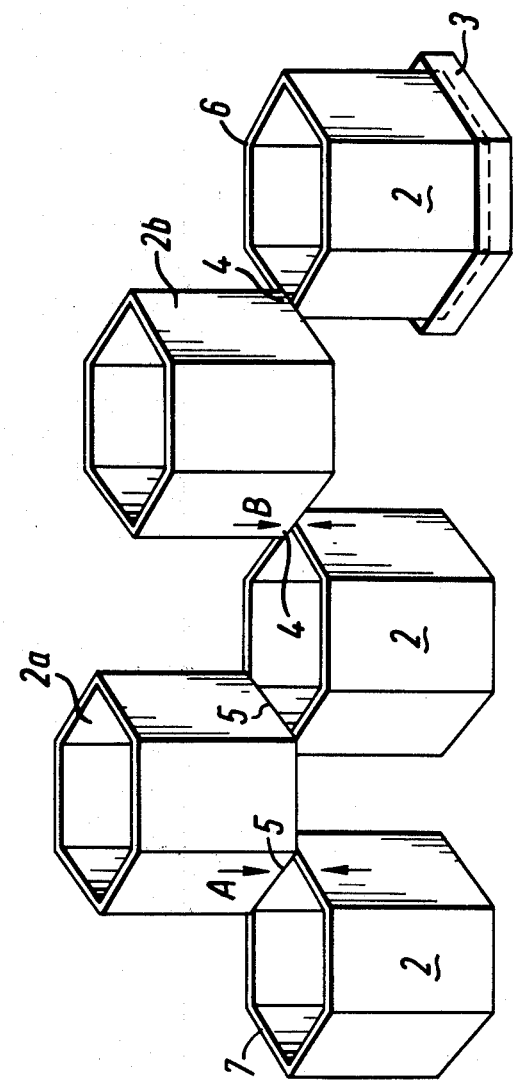
FIG. 1 shows a stacked array of containers in accordance with the invention, in this case plant pot holders.

Referring first to FIG. 1, an array of five plant pot holders (2) is shown, two of these being stacked above the other three. Of the two upper holders, that shown as (2a) is stacked above two others in edge to edge formation as shown at A. One of the upper edges (7) of each of two lower holders interlocks with projections on the bottom surface of the upper holder (2a), adjacent respective lower edges (5) thereof.

The container shown as (2b) is supported by two others in corner to corner formation as shown at B. A projection at each bottom corner (4) of the upper holder (2b) interlocks with one of the corners (6) at the upper end of each of two of the lower containers (2).

Each of the lower containers can be supported in a tray (3), of which only one is shown in FIG. 1. This tray will be described in more detail with reference to FIGS. 4 and 5.

Figure 2:
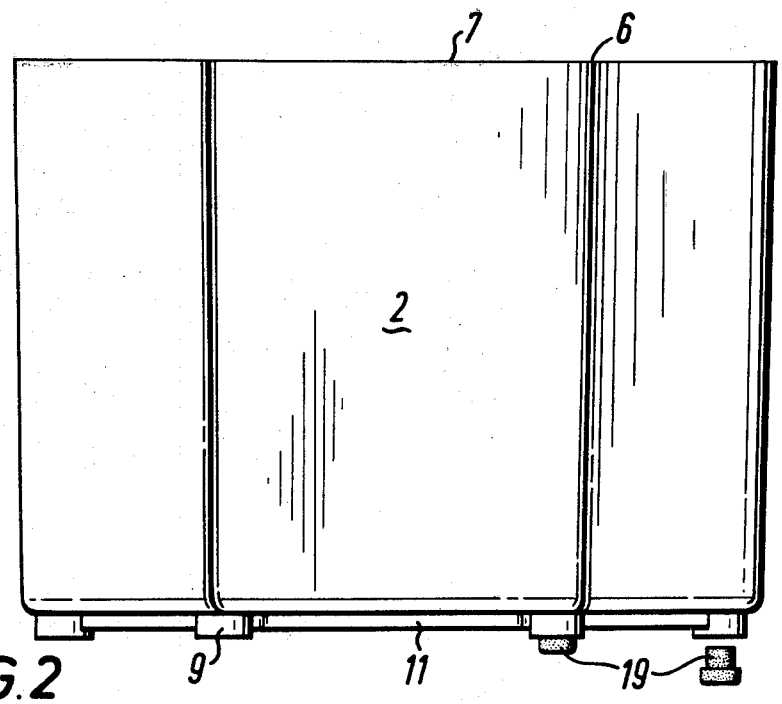
FIG. 2 is a side elevation of one of the containers of FIG. 1.
Figure 3:
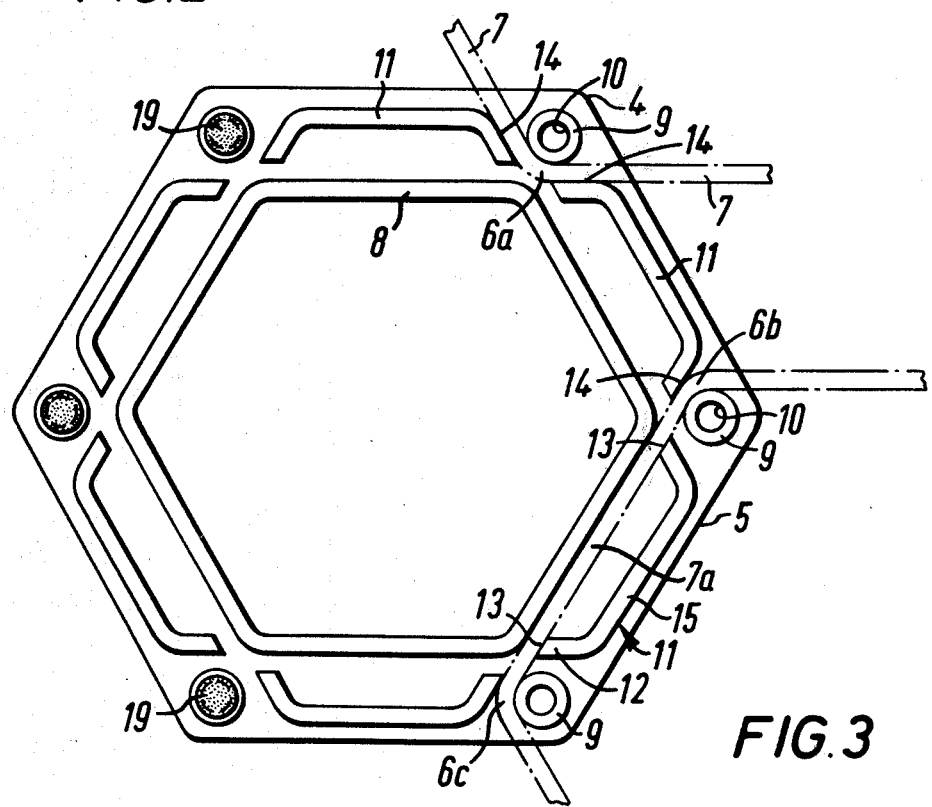
FIG. 3 is a bottom plan view of the container of FIG. 2, showing how the container can interlock with other containers below it.

Referring to FIGS. 2 and 3, each of the holders (2) is of hexagonal horizontal cross-section and has at each corner on its bottom surface a projection (9) of circular cross-section. Formed through each of these projections is a drain hole (10) to enable water to run out of the holder when a plant in the holder is watered.

Also formed on the bottom surface of the holder is a projection (8) in the form of a regular hexagon, concentric with the hexagonal bottom surface of the holder.

Also provided on the bottom surface of the holder are six projections (11) each of which comprises a portion (12) co-linear with one side of the hexagonal projection (8), on a line produce therefrom, and a portion (15) between one side of the hexagonal projection (8) and one bottom edge (5) of the holder, and parallel to both.

At the top right hand corner of the bottom of the holder as shown in the FIG. 3, is shown how the holder can be supported by an upper corner (6a) of another such holder. Between the circular corner projection (9) and surfaces (14) of two adjacent projections (11) are respective channels whose width is such as to accommodate the upper edges (7) of a supporting holder. The two holders are thus interlocked in a staggered corner to corner formation.

The lower left hand edge of the holder as shown in FIG. 3 is interlocked with an upper edge (7a) of a supporting container. This upper edge (7a) abuts on its outer side one side of the polygonal projection (8) and two surface portions (14) of respective projections (11). The two surface portions (18) against which it abuts are co-plannar with the corresponding side of the hexagonal projection (8).

The inner side of the supporting container bears against two of the circular corner projections (9) and also against co-plannar surfaces (13) at opposite ends of one of the projections (11). In this case therefore, the two holders are interlocked in edge to edge formation.

It will be seen from FIG. 3 that in both the edge to edge and the corner to corner formation, the upper holder has at least one drain hole (10) opening into the lower holder supporting it. Any drain hole which is not positioned immediately above another holder or a tray (3) can be closed off by means of a bung (19). If each of the bottom holders (2) of the array is stood in a supporting tray (3), plants in any of the holders can be water and the water will run out through the respective drain holes of successive holders until it reaches one of the trays (3).

Figure 4:
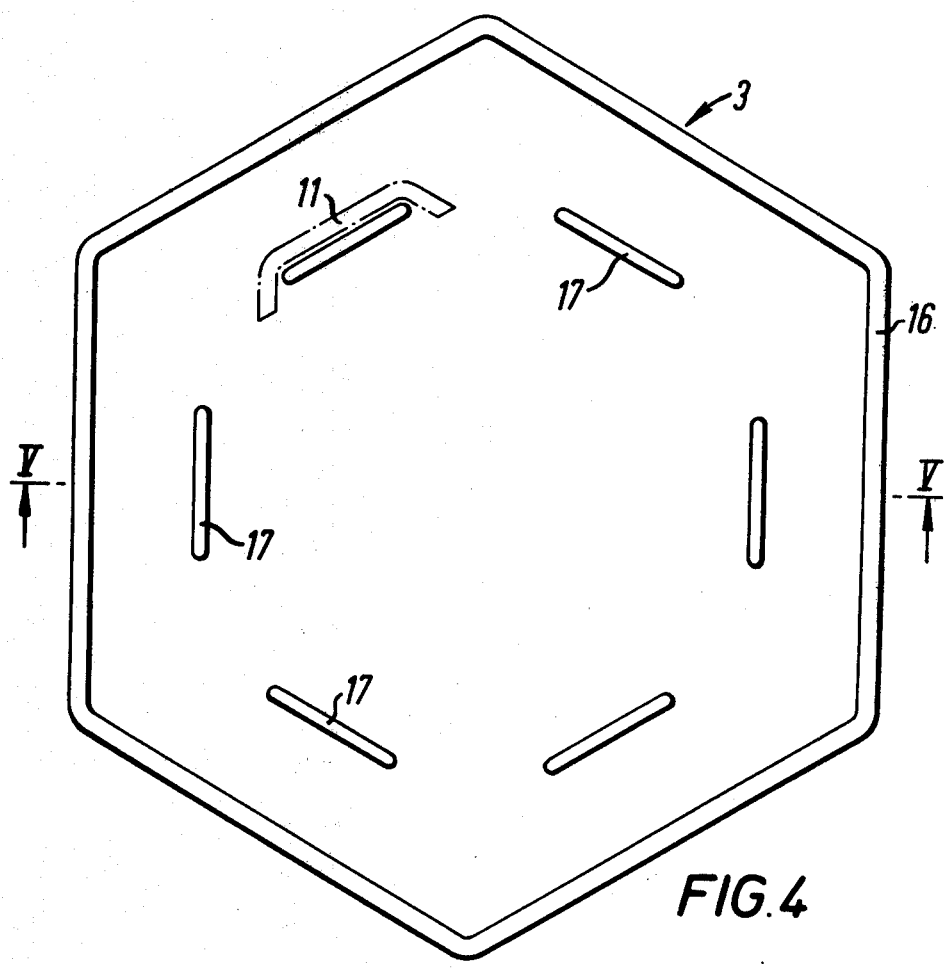
FIG. 4 is a top plan view of a supporting tray for the container of FIGS. 2 and 3.
Figure 5:
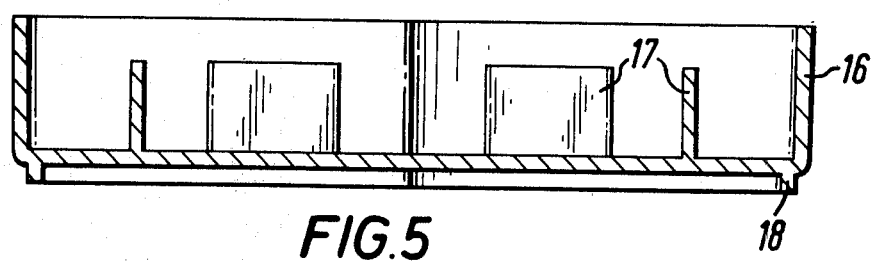
FIG. 5 is a vertical cross-section on the line V—V of FIG. 4.

The tray (3) is shown in detail in FIGS. 4 and 5. The tray is also hexagonal in plan view and has an outer wall (16) and a lower supporting rim (18). Within the tray are six support flanges (17), shaped and positioned so that each fits along the inner side of a respective projection (11) on the bottom surface of a holder (2) as shown in the broken lines in FIG. 4. In this way the holder (2) can be centred with its vertical axis immediately above the centre of the tray.

It is also possible if desired when building an array of holders (2) to position one holder directly above another, in which case the six corner projections (10) of the upper holder will fit within the corners (6) at the upper end of the lower holder. It will not of course then be possible to stand a plant in the lower holder but the arrangement will give the impression of a holder having twice the height of the others.

Other embodiments are envisaged within the scope of the invention. The containers can of course have many other shapes, for example cylindrical. In this case, the container could have an annular flange round its lower edge having slots therein to accommodate the upper edges of a supporting container.

The bottom formations of the container need not of course be integral with the container itself, but may comprise an attachment of the same or a different material.

The bottom of the container can be cambered to ensure that water drains easily to the holes at the corners.

I claim:

1. A stackable container having an open upper end, an underside with projections thereon adapted to cooperate with an edge of the upper end of a similar container, at least the upper and lower ends of the container being polygonal in plan view and said projections on the underside comprising:

(a) an essentially polygonal projection having the same number of sides as the polygonal lower end of the container, the sides of said projection being parallel to respective sides of the container and spaced inwardly therefrom;

(b) a plurality of corner projections between respective bottom corners of the container and adjacent corners of said polygonal projection, said corner projections having drain holes formed therethrough with removable plugging means and (c) further projections at positions between the polygonal projection and the bottom edges of the container and spaced from said corner projections, said further projections being spaced from said polygonal projection by at least the thickness of the upper edges of the container and said further projections and said corner projections defining between them channels corresponding in shape to the corners of the upper edge of the container, whereby a plurality of such containers can be stacked one above the other in a horizontally staggered corner-to-corner or edge-to-edge formation with each upper container having at least one said drain hole opening into a lower one when its respective plugging means is removed.

2. A container according to claim 1 wherein the said projections at the corners of the container are of circular horizontal cross-section.

3. A container according to claim 1 wherein the said further projections include portions having surfaces parallel to respective opposed outer sides of the polygonal projection and spaced therefrom to define channels to accommodate an upper edge of a similar container.

4. An array of containers according to claim 1 which are stacked in a horizontally staggered formation.

5. A container according to claim 1 wherein the polygonal projection and the upper edge of the container are hexagonal.

* * * * *